United States Patent
Wenzelburger et al.

[11] 3,920,653
[45] Nov. 18, 1975

[54] 1-AMINOURACIL COMPOUNDS AND HERBICIDAL COMPOSITIONS

[75] Inventors: Jürgen Wenzelburger; Gerhard Jäger, both of Wuppertal; Ludwig Eue; Robert R. Schmidt, both of Cologne, all of Germany

[73] Assignee: Bayer Aktiengesellschaft, Leverkusen, Germany

[22] Filed: Feb. 7, 1973

[21] Appl. No.: 330,524

[30] Foreign Application Priority Data
Feb. 18, 1972 Germany............................ 2207549

[52] U.S. Cl........... 260/256.4 C; 71/92; 260/244 R; 260/249.5; 260/256.4 Q; 260/256.4 R; 260/340.2; 260/343.9
[51] Int. Cl.²......................................... C07D 239/10
[58] Field of Search............... 260/256.4 Q, 256.4 C

[56] References Cited
UNITED STATES PATENTS
3,105,077  9/1963  Müller et al. ................. 260/256.4 C FOREIGN PATENTS OR APPLICATIONS
1,431,815  2/1966  France......................... 260/256.4 Q OTHER PUBLICATIONS
Kato et al., "Chemical Abstracts," Vol. 74, 1971, Col. 53718Z (Abstract of "Chem. Pharm. Bull.," 1970, Vol. 18(11), pp. 2278–2283).
Wenzelburber et al., "Chemical Abstracts," Vol. 79, 1973, Col. 126520U (Abstract of Ger. Offen. 2,207,549, Aug. 23, 1973).
Kloetzer et al., "Chemical Abstracts," Vol. 66, 1967, Col. 46390t (Abstract of "Monatsh. Chem." Vol. 96(6), 1965, pp. 1731–1738).

*Primary Examiner*—Richard J. Gallagher
*Assistant Examiner*—James H. Turnipseed
*Attorney, Agent, or Firm*—Burgess, Dinklage & Sprung

[57] ABSTRACT

1-Aminouracil compounds of the formula in which

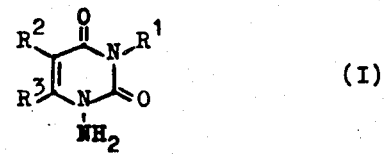

$R^1$ is an organic radical;
$R^2$ represents hydrogen, halogen, the thiocyanate radical, alkyl or optionally substituted aryl, and
$R^3$ represents alkyl or aralkyl optionally substituted in the aryl part, or
$R^2$ and $R^3$ together represent a multi-membered methylene bridge which forms, with the two carbon atoms in the 5- and 6- positions of the heterocyclic structure, a fused ring which is optionally substituted by alkyl; and agriculturally acceptable salts thereof;
are outstandingly effective as herbicides, particularly as broad spectrum total herbicides.

5 Claims, No Drawings

1-AMINOURACIL COMPOUNDS AND HERBICIDAL COMPOSITIONS

The present invention relates to certain new 1-aminouracil compounds, herbicidal compositions containing them and to their use as herbicides.

It has already been disclosed that uracils substituted in the N-3-position can be used for the chemical combating of weeds (see French Pat. No. 1,461,796 and U.S. Pat. No. 3,397,050). In particular, 3-sec.-butyl-5-bromo-6-methyluracil has attained great importance as a herbicidally active agent. Its activity is so broad even at low concentrations that it is mainly used as a total herbicidal agent.

It is furthermore known that 3-cyclohexyl-5,6-trimethylene-uracil is active as a herbicide [see U.S. Pat. Nos. 3,466,280 and 3,406,023 and German Offenlegungsschrift (German Published Specification) No. 1,567,037]. However, its activity is not always entirely satisfactory, especially if low amounts and concentrations are used.

The present invention provides compounds which are 1-aminouracils or salts thereof; the 1-aminouracils being of the general formula

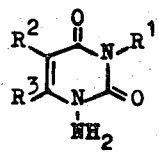

(I)

in which
R$^1$ is alkyl, alkenyl, alkynyl, cycloalkyl, alkylcycloalkyl, halocycloalkyl, terpenyl, haloalkyl, cyanoalkyl, alkoxyalkyl, alkoxycarbonylalkyl, alkoxycarbonyl, alkylthiocarbonyl, alkylcarbonyl, alkoxyalkylcarbonyl, aroxyalkylcarbonyl, alkylthioalkyl, arylsulphonyl, aralkyl optionally substituted in the aryl part, arylcarbonyl, optionally substituted phenoxycarbonyl, optionally substituted phenylthiocarbonyl, optionally substituted aryl or an optionally substituted heterocyclic structure,
R$^2$ represents hydrogen, halogen, the thiocyanate radical, alkyl or optionally substituted aryl, and
R$^3$ represents alkyl or aralkyl optionally substituted in the aryl part, or
R$^2$ and R$^3$ together represent a multi-membered methylene bridge which forms, with the two carbon atoms in the 5- and 6- positions of the heterocyclic structure, a fused ring which is optionally substituted by alkyl.

Generally, R$^1$ contains not more than 16 carbon atoms, R$^2$ not more than 16 carbon atoms and R$^3$ not more than nine carbon atoms.

Preferably R$^1$ represents straight-chain or branched alkyl with one to 13 carbon atoms; straight-chain or branched alkenyl of from three to six carbon atoms; straight-chain or branched alkynyl of from three to six carbon atoms; cycloalkyl of from five to eight carbon atoms, optionally substituted by alkyl of from one to three carbon atoms or by halogen (especially chlorine), in particular norbornyl-(2)-methyl; haloalkyl of from two to six carbon atoms and one to three halogen atoms (especially fluorine or chlorine); cyanoalkyl of from one to six carbon atoms (especially with two to four carbon atoms); alkoxyalkyl or alkoxycarbonylalkyl each with one to four carbon atoms in the alkyl part and one to three carbon atoms in the alkoxy part; alkylcarbonyl, alkoxycarbonyl, alkylthiocarbonyl or alkoxyalkylcarbonyl of from, in each case, two to six carbon atoms in the alkyl part and one to four carbon atoms in any alkoxy part; alkylthioalkyl of from two to six carbon atoms in the alkyl part and one to four carbon atoms in the alkylthio part; aroxyalkylcarbonyl of from, preferably, six or 10 carbon atoms in the aryl part and one or two carbon atoms in the alkyl part; optionally substituted aryl, aralkyl, arylcarbonyl or arylsulfonyl, in each case of from six to 10 carbon atoms in the aryl part and one or two carbon atoms in any alkyl part; phenoxycarbonyl or phenylthiocarbonyl optionally substituted in the phenyl nucleus; or an optionally substituted five- to seven- membered heterocyclic radical of from one to three hetero-atoms.

The preferred substituent of the aryl parts or of the heterocyclic structures mentioned above include straightchain or branched alkyl of from one to six carbon atoms, haloalkyl of from one to four carbon atoms and one to three halogen atoms (especially fluorine or chlorine), alkoxy and alkylthio of from one to four carbon atoms, dialkylamino of from one to four carbon atoms in the straight-chain or branched alkyl part, nitro, nitrile, halogen (especially fluorine, chlorine or bromine), haloalkylthio and haloalkoxy of from one to two carbon atoms and three to five halogen atoms (especially fluorine and chlorine) and alkoxycarbonylalkenyl of from two or three carbon atoms in the alkenyl part and one to three carbon atoms in the alkyl part.

The aryl radical (in particular phenyl) and the heterocyclic radical can possess one or more substituents.

R$^2$ preferably represents hydrogen, halogen (especially chlorine or bromine), straight-chain or branched alkyl with 1 to 6 carbon atoms, thiocyanate, or phenyl optionally substituted for example by any of the abovementioned substituents; and R$^3$ preferably represents straight-chain or branched alkyl of from one to six carbon atoms or phenylalkyl with one to three carbon atoms in the alkyl part; or R$^2$ and R$^3$ together preferably represent a straight-chain or branched methylene bridge of from three to five members which forms, with the two adjacent carbon atoms of the ring shown in formula (I), a five- or seven- membered ring which is optionally substituted by alkyl with one to three carbon atoms.

The invention also provides a process for the production of a compound of the invention in which (a) a 2,3-dihydro-1,3-oxazine-2,4-dione of the general formula

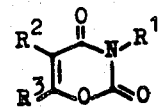

(II)

in which
R$^1$, R$^2$ and R$^3$ have the abovementioned meanings, is reacted with hydrazine, optionally in the presence of a diluent, at a temperature of −30° to +100°C or
(b) a 1-aminouracil of the general formula

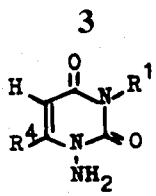

(IA)

in which
R[1] has the abovementioned meanings and
R[4] represents alkyl or aralkyl optionally substituted in the aryl part,
is reacted with halogen (especially bromine), or pseudohalogen, (especially thiocyanogen), optionally in the presence of an acid-binding agent and optionally in the presence of a diluent, at a temperature of 0° to 50°C.

If a salt is desired, it may of course be prepared in accordance with any convenient method from the compounds of the formula (I) obtained according to these two process variants.

Surprisingly, the compounds according to the invention show a substantially better selective-herbicidal activity than the known 3-sec.-butyl-5-bromo-6-methyluracil and an equally good herbicidal potency, and show a better herbicidal potency than 3-cyclohexyl-5,6-trimethyl-uracil, which are the chemically nearest substances of the same mode of action. The substances according to the invention thus represent an enrichment of the art.

If 3-isopropyl-2,3,4,5,6,7-hexahydrocyclopenta[e]1,3-oxazine-2,4-dione and hydrazine hydrate are used as the starting substances, the course of the reaction can be represented by the following formula scheme (process varient a):

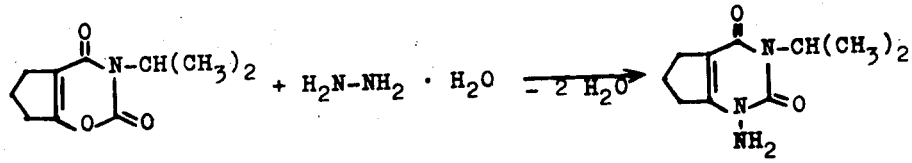

If 1-amino-3-isopropyl-6-methyluracil and bromine are used as starting substances, the course of the reaction can be represented by the following formula scheme (process variant b):

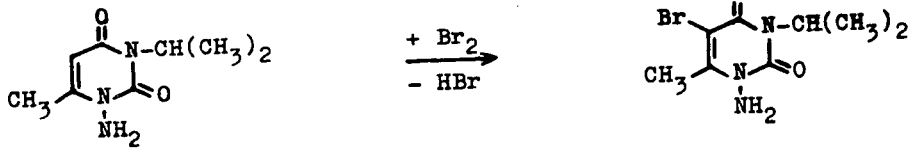

The 2,3-dihydro-1,3-oxazine-2,4-diones used as starting substances in process variant (a) are defined generally by the formula (II).

The following may be mentioned as examples of such 2,3-dihydro-1,3-oxazine-2,4-diones; 3-α-naphthyl-6-methyl-2,3-dihydro-1,3-oxazine-2,4-dione, 3-(norbornyl-2)-methyl-6-methyl-2,3-dihydro-1,3-oxazine-2,4-dione, 3-phenyl-5-chloro-6-methyl-2,3-dihydro-1,3-oxazine-2,4-dione, 3,6-dimethyl-2,3-dihydro-1,3-oxazine-2,4-dione, 3-(2-methylcyclohexyl)-6-methyl-2,3-dihydro-1,3-oxazine-2,4-dione, 3-(3-methylcyclohexyl)-6-methyl-2,3-dihydro-1,3-oxazine-2,4-dione, 3-(3,3,5-trimethylcyclohexyl)-6-methyl-2,3-dihydro-1,3-oxazine-2,4-dione, 3-cyclohexyl-5-methyl-6-ethyl-2,3-dihydro-1,3-oxazine-2,4-dione, 3-cyclohexyl-5-ethyl-6-propyl-2,3-dihydro-1,3-oxazine-2,4-dione, 3-cyclohexyl-5-methyl-6-isopropyl-2,3-dihydro-1,3-oxazine-2,4-dione, 3-(3,4-dichlorophenyl)5-methyl-6-ethyl-2,3-dihydro-1,3-oxazine-2,4-dione, 3-benzyl-6-methyl-2,3-dihydro-1,3-oxazine-2,4-dione, 3-(3-chlorophenyl)-6-methyl-2,3-dihydro-1,3-oxazine-2,4-dione, 3-(4-chlorophenyl)-6-methyl-2,3-dihydro-1,3-oxazine-2,4-dione, 3-(4-trifluoromethyl-phenyl)-6-methyl-2,3-dihydro-1,3-oxazine-2,4-dione, 3-(3-difluoromethyl-phenyl)-6-methyl-2,3-dihydro-1,3-oxazine-2,4-dione, 3-(2,6-diisopropylphenyl)-6-methyl-2,3-dihydro-1,3-oxazine-2,4-dione, 3-(4-methoxyphenyl)-6-methyl-2,3-dihydro-1,3-oxazine-2,4-dione, 3-benzoyl-6-methyl-2,3-dihydro-1,3-oxazine-2,4-dione, 3-cyclohexyl-6-methyl-2,3-dihydro-1,3-oxazine-2,4-dione, 3-isopropyl-6-methyl-2,3-dihydro-1,3-oxazine-2,4-dione, 3-n-butyl-6-methyl-2,3-dihydro-1,3-oxazine-2,4-dione, 3-(butyl-2)-6-methyl-2,3-dihydro-1,3-oxazine-2,4-dione, 3-(pentyl-3)-6-methyl-2,3-dihydro-1,3-oxazine-2,4-dione, 3-(4-methylpentyl)-6-methyl-2,3-dihydro-1,3-oxazine-2,4-dione, 3-(6-chloro-n-hexyl)-6-methyl-2,3-dihydro-1,3-oxazine-2,4-dione, 3-(2-chlorocyclohexyl)-6-methyl-2,3-dihydro-1,3-oxazine-2,4-dione, 3-(2-chloroethyl)-6-methyl-2,3-dihydro-1,3-oxazine-2,4-dione, 3-ethoxycarbonylmethyl-6-methyl-2,3-dihydro-1,3-oxazine-2,4-dione, 3-(4-methylphenylsulphonyl)-6-methyl-2,3-dihydro-1,3-oxazine-2,4-dione, 3-(3-chloro-4-trifluoromethyl-phenyl)-6-methyl-2,3-dihydro-1,3-oxazine-2,4-dione, 3-(4-chloro-3-trifluoromethylphenyl)-6-methyl-2,3-dihydro-1,3-oxazine-2,4-dione, 3-phenyl-6-methyl-2,3-dihydro-1,3-oxazine-2,4-dione, 3-(2,3,4,5-tetrachloropyridinyl-6)-6-methyl-2,3-dihydro-1,3-oxazine-2,4-dione, 3-(4,5,6-trichloropyrimidinyl-2)-6-methyl-2,3-dihydro-1,3-oxazine-2,4-dione, 3-(4,5-dichloro-2-trichloromethylpyrimidinyl-6)-6-methyl-2,3-dihydro-1,3-oxazine-2,4-dione, 3-(2,4-bis(trichloromethyl)-1,3,5-triazinyl-6)-6-methyl-2,3-dihydro-1,3-oxazine-2,4-dione, 3-(2,4-dichloro-1,3,5-triazinyl-6)-6-methyl-2,3-dihydro-1,3-oxazine-2,4-dione, 3-phenyl-2,3,4,5,6,7-hexahydrocyoxazine-2,4-dione, 3-(4-chloroclopenta[e]-1,3-oxazine-2,4-dione, 3-(4-chlorophenyl)-2,3,4,5,6,7-hexahydro-cyclopenta[e]-1,3-oxazine-2,4-dione, 3-(3-chloro-phenyl)-2,3,4,5,6,7-hexahydrocyclopenta[e]-1,3-oxazine-2,4-dione, 3-(4-chlorophenyl)-7,7-dimethyl-2,3,4,5,6,7-hexahydrocyclopenta[e]-1,3-oxazine-2,4-dione, 3-(4-chlorophenyl)-5,7,7-trimethyl-2,3,4,5,6,7-hexahydrocyclopenta[e]-1,3-oxazine-2,4-dione, 3-(3,4-dichlorophenyl)-2,3,4,5,6,7-hexahydro-cyclopenta[e]-1,3-oxazine-2,4-dione, 3-(4-trifluoromethylphenyl)-

2,3,4,5,6,7-hexahydro-cyclopenta[e]-1,3-oxazine-2,4-dione, 3-(2-ethylphenyl)-2,3,4,5,6,7-hexahydrocyclopenta[e]-1,3-oxazine-2,4-dione, 3-(3-methylphenyl)-2,3,4,5,6,7-hexahydro-cyclopenta[e]-1,3-oxazine-2,4-dione, 3-(2,6-diethyl-4-methylphenyl)-2,3,4,5,6,7-hexahydro-cyclopenta[e]-1,3-oxazine-2,4-dione, 3-(4-methoxyphenyl)-2,3,4,5,6,7-hexahydrocyclopenta[e]-1,3-oxazine-2,4-dione, 3-(β-phenylethyl)-2,3,4,5,6,7-hexahydro-cyclopenta[e]-1,3-oxazine-2,4-dione, 3-n-butyl-2,3,4,5,6,7-hexahydrocyclopenta[e]-1,3-oxazine-2,4-dione, 3-methyl-2,3,4,5,6,7-hexahydro-cyclopenta[e]-1,3-oxazine-2,4-dione, 3-ethyl-2,3,4,5,6,7-hexahydro-cyclopenta[e]-1,3-oxazine-2,4-dione, 3-cyclohexyl-2,3,4,5,6,7-hexahydro-cyclopenta[e]-1,3-oxazine-2,4-dione, 3-(2-methylcyclohexyl)-2,3,4,5,6,7-hexahydro-cyclopenta[e]-1,3-oxazine-2,4-dione, 3-(3-methylcyclohexyl)-2,3,4,5,6,7-hexahydro-cyclopenta[e]-1,3-oxazine-2,4-dione, 3-(4-methylcyclohexyl)-2,3,4,5,6,7-hexahydro-cyclopenta[e]-1,3-oxazine-2,4-dione, 3-isobutyl-2,3,4,5,6,7-hexahydro-cyclopenta[e]-1,3-oxazine-2,4-dione, 3-tert.-butyl-2,3,4,5,6,7-hexahydro-cyclopenta[e]-1,3-oxazine-2,4-dione, 3-(6-chlorocyclohexyl)-2,3,4,5,6,7-hexahydro-cyclopenta[e]-1,3-oxazine-2,4-dione, 3-cyclohexylmethyl-2,3,4,5,6,7-hexahydro-cyclopenta[e]-1,3-oxazine-2,4-dione, 3-methoxymethyl-2,3,4,5,6,7-hexahydro-cyclopenta[e]-1,3-oxazine-2,4-dione, 3-allyl-2,3,4,5,6,7-hexahydro-cyclopenta[e]-1,3-oxazine-2,4-dione, 3-propyl-2,3,4,5,6,7-hexahydro-cyclopenta[e]-1,3-oxazine-2,4-dione, 3-isopropyl-2,3,4,5,6,7-hexahydrocyclopenta[e]-1,3-oxazine-2,4-dione and 3-(3,5,5-trimethylcyclohexyl)-2,3,4,5,6,7-hexahydro-cyclopenta[e]-1,3-oxazine-2,4-dione.

Some of the 2,3-dihydro-1,3-oxazine-2,4-diones of the formula (II) which are used as starting substances are known [compare *J. Chem. Soc.* 1954 (London), 845 – 849]. Others from the subject of a separate patent application [compare German Patent Application No. P 19 60 818.5 (Le A 12, 691)]. They can be prepared by reacting 1,3-dioxin-4-ones of the general formula

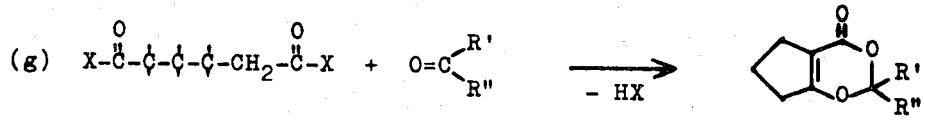

in which
R² and R³ have the meanings indicated above,
R⁵ represents hydrogen or alkyl and
R⁶ represents alkyl or aryl,
with isocyanates of the general formula
$R^1$—N=C=O    (IV)

in which
R¹ has the meaning indicated above,
optionally in the presence of an inert organic solvent, at a temperature of about +80° to +200°C (compare preparative examples and table).

The 1,3-dioxin-4-ones of the formula (III) required for this reaction can be obtained either by reaction of adipic acid dihalides with carbonyl compounds according to formula scheme (g) below [compare German Patent Application P 19 57 312.7 (Le A 12,563)], or by reaction of diketene or substituted diketenes with ketones in the presence of catalytic amounts of p-toluenesulfonic acid according to formula scheme (h) below [compare *Journal of the American Chemical Society* 74, 6305 (1952)]:

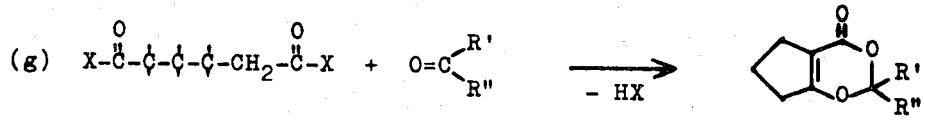

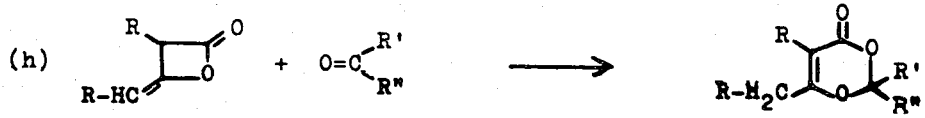

The 1-aminouracils of the formula (IA) used as starting substances in process variant (b) can be prepared according to process variant (a).

Possible diluents in process variant (a) include all inert organic solvents. These include hydrocarbons, such as decalin, tetralin and toluene; alcohols, such as ethanol, isopropanol or methanol; or acid amides, such as dimethylformamide.

Preferably, liquid ammonia, amines, such as triethylamine, or pyridine or mixtures of the abovementioned solvents with ammonia or amines are used.

The reaction temperatures in process variant (a) can be varied over a wide range. Temperatures of —30° to +100°C, preferably —30° to +30°C, are used.

The reaction is in general carried out under normal pressure but can also successfully be carried out at 1 to 10 atmospheres excess pressure.

In carrying out process variant (a), 1 to 10 mols of hydrazine hydrate, preferably 1 to 5 mols, are generally employed per mol of 2,3-dihydro-1,3-oxazine-2,4-dione of the formula (II). The 2,3-dihydro-1,3-oxazine-2,4-dione of the formula (II) may be added, either in bulk or dissolved in one of the abovementioned solvents, to the hydrazine hydrate or to a solution of hydrazine hydrate, and the mixture may be stirred for some hours. For working up, any excess solvent may be distilled off to the extent of about half, and the resulting precipitate may be filtered off and purified by recrystallization.

Possible diluents in process variant (b) include all polar organic solvents. These preferably include alcohols, such as methanol, ethanol and butanol; ethers, such as dioxan and tetrahydrofuran; nitriles, such as tolunitrile and acetonitrile; chlorinated hydrocarbons, such as chloroform and methyl chloride; and organic acids, such as glacial acetic acid.

The reaction may be carried out with the aid of an acid-binding agent. Possible acid-binding agents include alkaline earth metal hydroxides, such as calcium hydroxide; alkali metal hydroxides, such as potassium hydroxide; alkali metal carbonates, such as sodium carbonate; and alkali metal acetates, such as sodium acetate.

The reaction temperatures can be varied over a substantial range. In general, temperatures of between 0° and +100°C, preferably between +10° and +50°C, are used.

In carrying out the process according to the invention, about 1 mol of halogen and about 1 to 1.5 mols of acid-binding agent are generally employed per mol of 1-aminouracil of the formula (IA). In this process variant, a solution of the halogen or pseudo-halogen (the latter may be prepared in situ) may be added dropwise to a solution of the uracil. To isolate the compounds of the formula (IA), the bulk of the solvent may be distilled off and the resulting precipitate is filtered off and purified by recrystallization.

EXAMPLE 1

Preparation of 1-amino-3-n-propyl-5,6-trimethylene-uracil

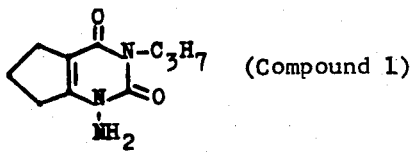 (Compound 1)

64 g (0.34 mol) of 3-n-propyl-2,3,4,5,6,7-hexahydrocyclopenta[e]-1,3-oxazine-2,4-dione were stirred into 180 ml (3.4 mols) of hydrazine hydrate, cooled to −5°C, over the course of 45 minutes whilst cooling externally. After completion of the addition, the reaction mixture was slowly stirred until it reached room temperature. The precipitate which had separated out was filtered off, well rinsed with water and dried in vacuo over phosphorus pentoxide.

58.8 g (93.7% of theory) of 1-amino-3-n-propyl-5,6-trimethylene-uracil of melting point 126°–127°C were obtained.

EXAMPLE 2

Preparation of 1-amino-3-isopropyl-6-methyluracil

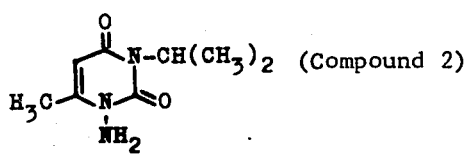 (Compound 2)

16.9 g (0.1 mol) of finely powdered 3-isopropyl-6-methyl-2,3-dihydro-oxazine-2,4-dione were introduced in portions into 30 ml (0.58 mol) of hydrazine hydrate whilst stirring, at a temperature of 5°–10°C. After a reaction time of 12 hours at 10°C, the precipitate formed was filtered off, rinsed with water and dried over phosphorus pentoxide.

11.8 g (86.5% of theory) of 1-amino-3-isopropyl-6-methyl-uracil of melting point 119°–120°C were obtained.

EXAMPLE 3

Preparation of 1-amino-3-cyclohexyl-6-methyluracil

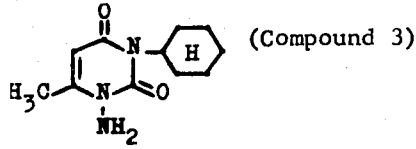 (Compound 3)

A suspension of 42 g (0.2 mol) of 3-cyclohexyl-6-methyl-2,3-dihydro-oxazine-2,4-dione in 200 ml of anhydrous isopropanol was first prepared and gaseous ammonia was passed into the mixture at a temperature of −25°C until saturation was reached. 41.7 ml (0.8 mol) of hydrazine hydrate were then added and the mixture was stirred for 3 hours at −20°C. Thereafter the temperature was allowed to rise to −10°C, whereupon the reaction mixture changed to a clear solution. After stirring for a further half-hour at −10°C the reaction solution was diluted with a three-fold amount of water and adjusted to pH 3 with dilute hydrochloric acid, whereupon a crystalline precipitate resulted.

Filtration yielded 39.8 g (89% of theory) of 1-amino-3-cyclohexyl-6-methyl-uracil of melting point 123°–124°C.

Process variant:

A suspension of 630 g (3 mols) of 3-cyclohexyl-6-methyl-2,3-dihydro-oxazine-2,4-dione in 2.5 l of isopropanol was prepared as above and 31.3 ml (0.6 mol) of hydrazine hydrate were added at a temperature of −20°C. The mixture was stirred as indicated above at −20°C for 3 hours and at −10°C for half an hour and the batch was worked up analogously.

475 g (71% of theory) of 1-amino-3-cyclohexyl-6-methyl-uracil of melting point 123°C were obtained.

EXAMPLE 4

Preparation of 1-amino-3-cyclohexyl-5,6-trimethylene-uracil

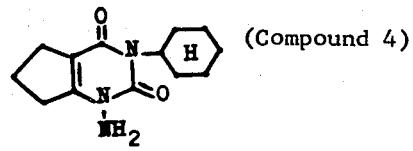 (Compound 4)

A solution of 30 ml (0.6 mol) of hydrazine hydrate in 30 ml of dimethylformamide was added dropwise, whilst stirring, to a solution of 23.5 (0.1 mol) of 3-cyclohexyl-2,3,4,5,6,7-hexahydro-cyclopenta[e]-1,3-oxazine-2,4-dione in 30 ml of dimethylformamide at a temperature of −2° to +6°C and the reaction mixture was stirred for 12 hours at +6°C. Thereafter 800 ml of water were added whilst stirring and the precipitate produced was filtered off, washed with water and dried over phosphorus pentoxide.

17 g (70% of theory) of 1-amino-3-cyclohexyl-5,6-trimethylene-uracil of melting point 149°–150°C were obtained.

The hydrochloride was prepared as follows:

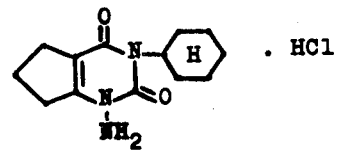 . HCl 12.4 g (0.05 mol) of 1-amino-3-cyclohexyl-5,6-trimethylene uracil were dissolved in 100 ml of methylene chloride and thereafter dry hydrogen chloride was passed in at a temperature of 0° to +10°C until a precipitate had formed. This was allowed to settle and was filtered off, washed with ether and dried in vacuo.

14.3 g of 1-amino-3-cyclohexyl-5,6-trimethylene-uracil hydrochloride of melting point 156°–158°C (decomposition) were thus obtained in practically quantitative yield.

EXAMPLE 5

Preparation of 1-amino-3-n-butyl-6-methyl-uracil

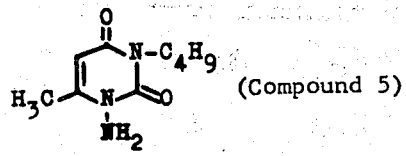  (Compound 5)

21 ml (0.4 mol) of hydrazine hydrate were dissolved in 100 ml of liquid ammonia, 18.4 g (0.1 mol) of 3-n-butyl-6-methyl-2,3-dihydro-oxazine-2,4-dione were added at −50°C and the mixture was stirred for 16 hours at this temperature. It was thereafter slowly warmed to room temperature, whereupon the ammonia gradually evaporated. The residue obtained was treated with water and adjusted to pH 3 with 10% strength aqueous hydrochloric acid. A precipitate resulted which was filtered off and purified by recrystallization from water with addition of active charcoal.

15.8 g (80% of theory) of 1-amino-3-n-butyl-6-methyl-uracil of melting point 86°–88°C were obtained.

EXAMPLE 6

Preparation of 1-amino-5-bromo-3-cyclohexyl-6-methyl-uracil

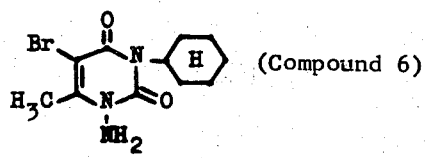  (Compound 6)

13.3 g (0.2 mol) of anhydrous sodium acetate were added to a solution of 44.6 g (0.2 mol) of 1-amino-3-cyclohexyl-6-methyl-uracil in 150 ml of chloroform and 33.6 g (0.22 mol) of bromine were added dropwise at a temperature of 10° – 15°C. The reaction solution was thereafter vigorously stirred for a further 30 minutes, water was then added and the whole was vigorously stirred for a short time. The two phases were separated, the organic phase was dried over sodium sulfate, the solvent was distilled off and the residue was recrystallized from acetonitrile.

49.7 g (82% of theory) of 1-amino-5-bromo-3-cyclohexyl-6-methyl-uracil of melting point 158°C were obtained.

EXAMPLE 7

Preparation of 1-amino-3-isopropyl-5-bromo-6-methyl-uracil

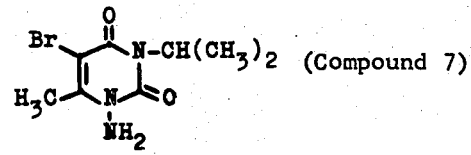  (Compound 7)

A solution of 16 g (0.1 mol) of bromine in 20 ml of glacial acetic acid was added dropwise at a temperature of 15°–20°C to a solution of 18.3 g (0.1 mol) of 1-amino-3-isopropyl-6-methyl-uracil and 8.2 g of anhydrous sodium acetate (0.12 mol) in 100 ml of glacial acetic acid. After a reaction time of 15 minutes at room temperature the bulk of the solvent was distilled off in vacuo, the residue was treated with water and the solid produced was filtered off.

After recrystallization from methanol, 19.5 g (74.5% of theory) of 1-amino-3-isopropyl-5-bromo-6-methyl-uracil of melting point 116°–118°C were obtained.

EXAMPLES 8–58

The compounds in the Table which follows were prepared analogously to those of Examples 1–7.

Table 1

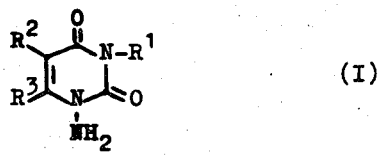

(I)

| Example | $R^1$ | $R^2$ | $R^3$ | Melting point (°C) |
|---|---|---|---|---|
| 8 | $CH_3$ | | $-(CH_2)_3-$ | 146 – 147 |
| 9 | $C_2H_5$ | | $-(CH_2)_3-$ | 132 – 133 |
| 10 | $C_2H_5$ | | $-(CH_2)_3-$ | Hydrochloride 150 – 152 |
| 11 | $CH(CH_3)_2$ | | $-(CH_2)_3-$ | 136 |
| 12 | $CH(CH_3)_2$ | | $-(CH_2)_3-$ | Hydrochloride 156 – 157 |

Table 1 (continued)
| Example | R¹ | R² | R³ | Melting point (°C) |
|---|---|---|---|---|
| 13 | C₄H₉ | —(CH₂)₃— | | 99 – 100 |
| 14 | CH₂–CH(CH₃)₂ | —(CH₂)₃— | | 129 |
| 15 | CH(CH₃)–C₂H₅ | —(CH₂)₃— | | 77 – 78 |
| 16 | CH₂–CH=CH₂ | —(CH₂)₃— | | 123 – 124 |
| 17 | CH₂–OCH₃ | —(CH₂)₃— | | 96.5 – 97.5 |
| 18 | (CH₂)₅–CH₂Cl | —(CH₂)₃— | | 66 – 67 |
| 19 |  | H | CH₃ | 218–220 |
| 20 | 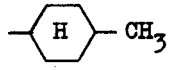 | H | CH₃ | 119 – 121 |
| 21 | CH₃ | H | CH₃ | 138 – 140 |
| 22 | CH(CH₃)–C₂H₅ | H | CH₃ | 60 – 62 |
| 23 | CH₃ | Br | CH₃ | 172 |
| 24 | C₄H₉ | Br | CH₃ | 108 – 110 |
| 25 | CH(CH₃)–C₂H₅ | Br | CH₃ | 94 |
| 26 |  | Br | CH₃ | 162 – 164 |
| 27 | 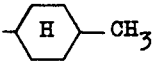 | Br | CH₃ | 188 – 190 |
| 28 | 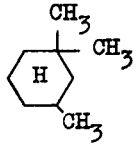 | —(CH₂)₃— | | 194 – 195 |
| 29 | 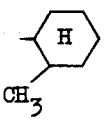 | —(CH₂)₃— | | 122 – 123 |
| 30 | 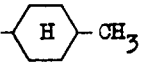 | —(CH₂)₃— | | 155.5 – 156 |
| 31 |  | —(CH₂)₃— | | 154 – 155 |

Table 1 (continued)

| Example | R¹ | R² | R³ | Melting point (°C) |
|---|---|---|---|---|
| 32 | cyclohexyl-H | -CH-CH$_2$-C(CH$_3$)$_3$ with CH$_3$ on first carbon | | 164 - 165 |
| 33 | $(C_2H_5)_2CH$ | H | CH$_3$ | 76 |
| 34 | $(CH_3)_2CH-CH_2-CH(CH_3)$ | H | CH$_3$ | 70 |
| 35 | C$_6$H$_5$-CH$_2$ | Br | CH$_3$ | 188 |
| 36 | C$_6$H$_5$-CH$_2$ | H | CH$_3$ | 140 |
| 37 | cycloheptyl | Br | CH$_3$ | 138 - 139 |
| 38 | cyclohexyl(H)-CH$_2$ | Br | CH$_3$ | 154 |
| 39 | cycloheptyl | H | CH$_3$ | 136 - 137 |
| 40 | cyclohexyl(H)-CH$_2$ | H | CH$_3$ | 130 |
| 41 | n-C$_7$H$_{15}$ | Br | CH$_3$ | 84 |
| 42 | n-C$_7$H$_{15}$ | H | CH$_3$ | 78 |
| 43 | C$_6$H$_5$-CH$_2$-CH$_2$ | Br | CH$_3$ | 200 - 202 |
| 44 | C$_6$H$_5$-CH$_2$-CH$_2$ | H | CH$_3$ | 155 - 156 |
| 45 | cyclooctyl | Br | CH$_3$ | 143.5 - 144.5 |
| 46 | cyclooctyl | H | CH$_3$ | 106 - 107 |
| 47 | ClCH$_2$CH$_2$ | -(CH$_2$)$_3$- | | 130 - 131.5 |
| 48 | C$_6$H$_5$-CH$_2$ | -(CH$_2$)$_3$- | | 145.5 - 146.5 |
| 49 | cyclohexyl(H)-CH$_2$ | -(CH$_2$)$_3$- | | 136 - 137 |

Table 1 (continued)

| Example | R¹ | R² R³ | Melting point (°C) |
|---|---|---|---|
| 50 | cycloheptyl | $-(CH_2)_3-$ | 127 - 128 |
| 51 | $(CH_3)_2CH-CH_2-O-\overset{O}{\underset{\|}{C}}-CH_2CH_2$ | $-(CH_2)_3-$ | 93 - 94 |
| 52 | $C_6H_5-\underset{CH_3}{\overset{\|}{CH}}-$ | $-(CH_2)_3-$ | 123 - 124 |
| 53 | $C_6H_5-CH_2-CH_2-$ | $-(CH_2)_3-$ | 197 - 198 |
| 54 | $\underset{C_9H_{19}}{\overset{CH_3}{>}}CH-$ | $-(CH_2)_3-$ | 64 - 65 |
| 55 | $CH_3-(CH_2)_{11}-$ | $-(CH_2)_3-$ | 70 - 71 |
| 56 | $CH_3-\langle H \rangle-$ | $\begin{Bmatrix} -\underset{\|}{\overset{CH_3}{CH}}-CH_2-CH_2- \\ -CH_2-\underset{\|}{\overset{\|}{CH}}-CH_2- \\ CH_3 \end{Bmatrix}$ 1:1 mixture | 65 - 67 |
| 57 | $\langle H \rangle-$ | $\begin{Bmatrix} -\underset{\|}{\overset{CH_3}{CH}}-CH_2-CH_2- \\ -CH_2-\underset{\|}{\overset{\|}{CH}}-CH_2- \\ CH_3 \end{Bmatrix}$ 1:1 mixture | 113 - 115 |
| 58 | $(CH_3)_2CHCH_2-$ | $\begin{Bmatrix} \overset{CH_3}{\underset{\|}{HC}}-CH_2-CH_2- \\ H_2C-\underset{\|}{CH}-CH_3- \\ CH_3 \end{Bmatrix}$ 1:1 mixture | 83 - 84 |

The starting material for the compound of Example 4 can be prepared as follows:

A solution of 168.2 g (1 mol) of 2,2-dimethyl-4,5,6,7-tetrahydro-cyclopenta[e]-1,3-dioxin-4-one [preparation of this compound, compare page 7 of German Offenlegungschrift (German Published Specification) No. 1,957,312] in 300 ml of xylene was added dropwise over the course of 1½ hours to a solution, heated to 140°C, of 187.8 g (1.5 mols) of cyclohexylisocyanate in 250 ml of xylene. The acetone formed in the reaction was continuously distilled off and thus removed from the reaction mixture. Thereafter the solvent was distilled off under reduced pressure and the residue was distilled in vacuo. 166.3 g (70% of theory)

of 3-cyclohexyl-2,3,4,5,6,7-hexahydro-cyclopenta[e]-1,3-oxazine-2,4-dione of boiling point 164°–165°C/0.5 mm, which solidified to crystals and then melted at 70°–71°C, were obtained.

The other starting materials listed in the two tables which follow can also be prepared analogously:

Table 2

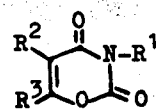

(II)

| Example No. | R¹ | R² | R³ | Melting point (°C) |
|---|---|---|---|---|
| I | 2-CF₃-C₆H₄- | H | CH₃ | 132 - 135 |
| II | 3-CF₃-C₆H₄- | H | CH₃ | 133 - 134 |
| III | 4-F-C₆H₄- | H | CH₃ | 190 - 191 |
| IV | 3-CH₃-C₆H₄- | H | CH₃ | 128 |
| V | 3-(CH=CH-COOC₂H₅)-C₆H₄- | H | CH₃ | 184 |
| VI | 4-CH₂Br-C₆H₄- | H | CH₃ | 248 |
| VII | 4-OCF₃-C₆H₄- | H | CH₃ | 188 |
| VIII | 2,3-Cl₂-C₆H₃- | H | CH₃ | 203 |
| IX | 2-Cl-3-F-C₆H₃- | H | CH₃ | 178 - 181 |
| X | 2,3-(CF₃)₂-C₆H₃- | H | CH₃ | 126 - 130 |

Table 2 (continued)
| Example No. | R¹ | R² | R³ | Melting point (°C) |
|---|---|---|---|---|
| XI | 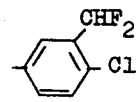 2-Cl, 4-(CHF₂) phenyl | H | CH₃ | 161 – 163 |
| XII | 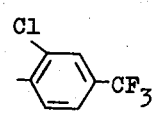 2-Cl, 4-(CF₃) phenyl | H | CH₃ | 126 – 127 |
| XIII | 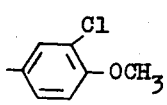 2-Cl, 4-(OCH₃) phenyl | H | CH₃ | 166 – 168 |
| XIV | 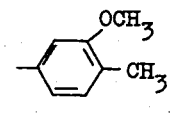 3-OCH₃, 4-CH₃ phenyl | H | CH₃ | 189 |
| XV | 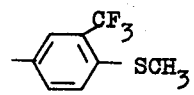 3-CF₃, 4-SCH₃ phenyl | H | CH₃ | 181 |
| XVI | 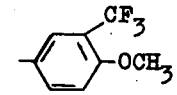 3-CF₃, 4-OCH₃ phenyl | H | CH₃ | 198 – 200 |
| XVII | 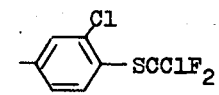 2-Cl, 4-SCClF₂ phenyl | H | CH₃ | 152 – 153 |
| XVIII | 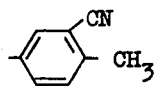 3-CN, 4-CH₃ phenyl | H | CH₃ | 229 – 232 |
| XIX | 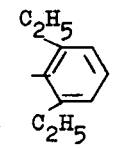 2,6-diethylphenyl | H | CH₃ | 90 – 92 |
| XX | 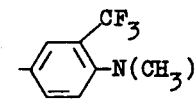 3-CF₃, 4-N(CH₃)₂ phenyl | H | CH₃ | 99 |

Table 2 (continued)

| Example No. | R¹ | R² | R³ | Melting point (°C) |
|---|---|---|---|---|
| XXI | 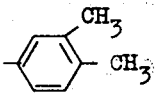 3,4-dimethylphenyl | H | CH₃ | 76 – 78 |
| XXII | 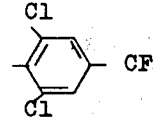 3,5-dichloro-4-CF₃-phenyl | H | CH₃ | 110 – 112 |
| XXIII | 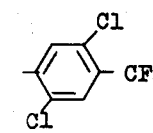 3,5-dichloro-CF₃-phenyl | H | CH₃ | 150 |
| XXIV | 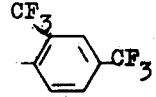 2,4-bis(CF₃)phenyl | H | CH₃ | 126 – 130 |
| XXV | 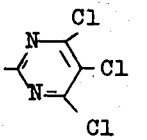 trichloropyrimidinyl | H | CH₃ | 198 – 200 |
| XXVI | 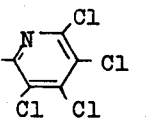 tetrachloropyridinyl | H | CH₃ | 180 |
| XXVII | 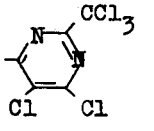 CCl₃-dichloropyrimidinyl | H | CH₃ | 186 |
| XXVIII | 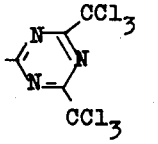 bis-CCl₃-pyrimidinyl | H | CH₃ | 142 |
| XXIX | 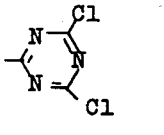 dichloropyrimidinyl | H | CH₃ | 117 |
| XXX | 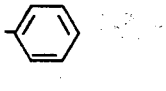 phenyl | Cl | CH₃ | 208 – 210 |
| XXXI | 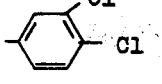 2,4-dichlorophenyl | CH₃ | C₂H₅ | 102 – 103 |

Table 2 (continued)

| Example No. | R¹ | R² | R³ | Melting point (°C) |
|---|---|---|---|---|
| XXXII | cyclohexyl (-C₆H₁₁) | CH₃ | C₂H₅ | 134-138/0.3 |
| XXXIII | cyclohexyl (-C₆H₁₁) | C₂H₅ | C₃H₇ | 145-149/0.8 |
| XXXIV | CH(CH₃)₂ | H | CH₃ | 52 - 55 |
| XXXV | CH(CH₃)-C₂H₅ | H | CH₃ | 94-98/0.1 |
| XXXVI | CH(CH₃)-C₂H₅ | Cl | CH₃ | 92-94/0.2 |
| XXXVII | CH₂-CH(CH₃)₂ | H | CH₃ | 57 - 59.5 |
| XXXVIII | CH(CH₃)-C₃H₇ | H | CH₃ | 90 - 92 /0.3 |
| XXXIX | CH-(C₃H₇)₂ | H | CH₃ | 100-102 /0.2 |
| XL | CH(CH₃)-(CH₂)₁₀-CH₃ | H | CH₃ | 183-188 /0.05 |
| XLI | CH₂OCH₃ | H | CH₃ | 77 - 78 |
| XLII | CH₂-CO-OC₂H₅ | H | CH₃ | 76 - 78 |
| XLIII | 2-methylcyclohexyl | H | CH₃ | 130 - 135 /0.1 |
| XLIV | 3-methylcyclohexyl | H | CH₃ | 58 - 60 |
| XLV | 4-methylcyclohexyl | H | CH₃ | 177 - 179 |
| XLVI | 2,2,6-trimethylcyclohexyl | H | CH₃ | 135 - 140/0.1 |
| XLVII | -CH(C₂H₅)CH₂CN | H | CH₃ | 145 - 148 /0.2 |

Table 2 (continued)
| Example No. | R¹ | R² | R³ | Melting point (°C) |
|---|---|---|---|---|
| XLVIII | -CO-S-C₄H₉ | H | CH₃ | 48 |
| IL | -CO-O-C₆H₅ | H | CH₃ | 153 - 156 |
| L | -CO-S-C₆H₅ | H | CH₃ | 123 - 125 |
Table 3
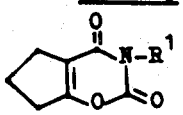
(IIA)
| Example No. | R¹ | Melting point °C or boiling point °C/mm Hg |
|---|---|---|
| I | CH₃ | 41 - 42; 142/0.6 |
| II | C₂H₅ | 108/0.6 |
| III | C₃H₇ | 141-142/0.9 |
| IV | CH(CH₃)₂ | 136-137/0.6 |
| V | CH₂-CH(CH₃)₂ | 143-144/1.2 |
| VI | CH(CH₃)-C₂H₅ | 143/1 |
| VII | C(CH₃)₃ | 112-113/0.3 |
| VIII | CH₂-CH=CH₂ | 132-134/0.7 |
| IX | CH₂OCH₃ | 174-176/1.2 |
| X | -C₆H₄(o-CF₃) | 139 - 141 |
| XI | -C₆H₃(2-Cl,4-CF₃) | 143 - 144 |

Table 3 (continued)
| Example No. | R¹ | Melting point °C or boiling point °C/mm Hg |
|---|---|---|
| XII | 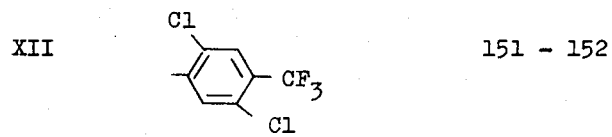 | 151 – 152 |
| XIII | 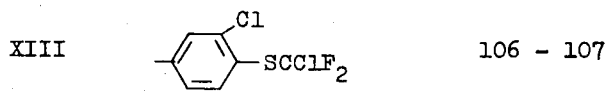 | 106 – 107 |
| XIV | 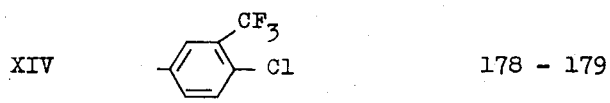 | 178 – 179 |
| XV | 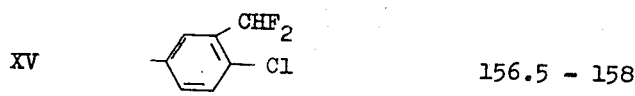 | 156.5 – 158 |
| XVI |  | 176-178/0.7 |
| XVII | 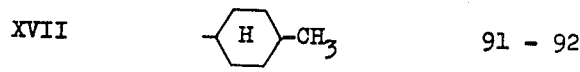 | 91 – 92 |
| XVIII |  | 177-178/0.45 |
| XIX | 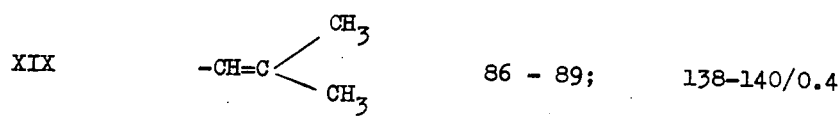 | 86 – 89; 138-140/0.4 |
| XX |  | 200-202/1.3 |
| XXI |  | 153/0.25 |

The new 1-aminouracils according to the invention and their salts possess herbicidal properties and can therefore be used for combating weeds.

As weeds in the broadest sense there are to be understood all plants which grow in positions where they are undesired. Whether the active compounds according to the invention act as total-herbicidal or selective-herbicidal agents depends on the amount of active compound used.

The active compounds according to the invention can be used for example in the case of the following plants: dicotyledons, such as mustard (Sinapis), cress (Lepidium), cleavers (Galium), chickweed (Stellaria), camomile (Matricaria), gallant soldier (Galinsoga), goosefoot (Chenopodium), annual nettle (Urtica), groundsel (Senecio), cotton (Gossypium), beets (Beta), carrots (Daucus), beans (Phaseolus); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum).

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents, and/or foam-forming agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulfoxide or acetonitrile, as well as water.

By liquefied gaseous diluents or carriers are meant liquids which would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly dispersed silicic acid, alumina or silicates.

Preferred examples of emulsifying and foam-forming agents include non-ionic and anionic amulsifiers, such as polyoxyethylene-fatty acid esters, polyoxyethylene-fatty alcohol ethers, for example alkylarylpolyglycol ethers, alkyl sulphonates, alkyl sulphates and aryl sulphonates as well as albumin hydrolyzation products; and preferred examples of dispersing agents include lignin, sulfite waste liquors and methyl cellulose.

The active compounds according to the invention can be present in the formulations as a mixture with other active compounds.

The formulations in general contain from 0.1 to 95 percent by weight of active compound, preferably 0.5 to 90.

The active compounds can be employed as such or in the form of their formulations or the application forms prepared therefrom, such as ready-to-use solutions, emulsions, suspensions, powders, pastes and granules. They may be applied in the customary manner, for example by atomising, spraying, squirting, watering and sprinkling.

The amount of active compounds applied can vary within wide ranges. It essentially depends on the nature of the desired effect. In general the amounts used are 0.1 to 20 kg of active compound per hectare, preferably 0.2 to 15 kg per hectare.

The invention therefore provides a herbicidal composition containing as active ingredient a compound according to the invention in admixture with a solid or liquefied gaseous diluent or carrier or in admixture with a liquid diluent or carrier containing a surface-active agent.

The invention also provides a method of combating weeds which comprises applying to the weeds or their habitat a compound according to the invention alone or in the form of a composition containing as active ingredient a compound according to the invention in admixture with a diluent or carrier.

The invention also provides methods of obtaining crops protected from damage by weeds by being grown in areas in which, immediately prior to and/or during the time of the growing, a compound according to the invention was applied alone or in admixture with a diluent or carrier. It will be seen that the usual methods of providing a harvested crop may be improved by the present invention.

The compounds according to the invention, and the preparation and use of the compounds according to the invention, are illustrated by the following Examples.

EXAMPLE A

Post-emergence test
 Solvent: 5 parts by weight of acetone
 Emulsifier: 1 part by weight of alkylaryl-polyglycolether To produce a suitable preparation of active compound, 1 part by weight of active compound was mixed with the stated amount of solvent, the stated amount of emulsifier was added and the concentrate was then diluted with water to the desired concentration.

Test plants which were 5–15 cm high, were sprayed with the preparation of the active compound in such a way that the amounts of active compound per unit area indicated in the table were applied. Depending on the concentration of the spray liquor, the amount of water used was between 1,000 and 2,000 liters per hectare. After 3 weeks the degree of damage to the plants was determined and characterized by the value 0 – 5, which have the following meaning:
 0—no effect
 1—individual slight scorching spots
 2—distinct damage to the leaves
 3—individual leaves and parts of stems in part dead
 4—plant partially destroyed
 5—plant completely dead.

The active compounds, the amounts applied and the results can be seen from the following Table A.

Table A
Post-emergence test
| Active compound | Amount of active compound used, kg/ha | Echino-chloa | Cheno-podium | Sina-pis | Galin-soga | Stellaria | Urtica | Matri-caria | Daucus |
|---|---|---|---|---|---|---|---|---|---|
| 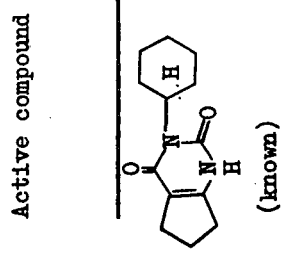 (known) | 2<br>1 | 5<br>5 | 1<br>0 | 5<br>5 | 5<br>3 | 5<br>4 - 5 | 5<br>3 | 5<br>4 - 5 | 3<br>2 |
| 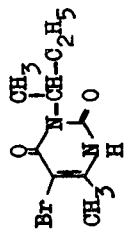 | 2<br>1 | 5<br>5 | 5<br>5 | 5<br>5 | 5<br>5 | 5<br>5 | 5<br>5 | 5<br>5 | 5<br>5 |
| 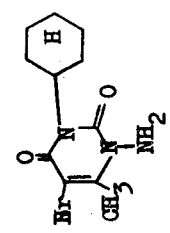 (known) | 2<br>1 | | | | | 5<br>5 | 5<br>5 | 5<br>5 | 5<br>5 |

Table A (continued)
Post-emergence test
| Active compound | Amount of active compound used, kg/ha | Echino-chloa | Cheno-podium | Sina-pis | Galin-soga | Stellaria | Urtica | Matri-caria | Daucus |
|---|---|---|---|---|---|---|---|---|---|
| 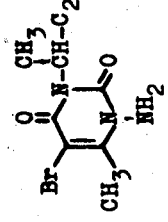 | 2 | 5 | 5 | 5 | 5 | 5 | 5 | 5 | 5 |
|  | 1 | 5 | 5 | 5 | 5 | 5 | 5 | 5 | 5 |
| 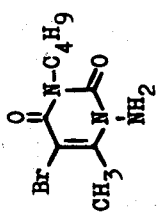 | 2 | 5 | 5 | 5 | 5 | 5 | 5 | 5 | 5 |
|  | 1 | 5 | 5 | 5 | 5 | 5 | 5 | 5 | 5 |
| 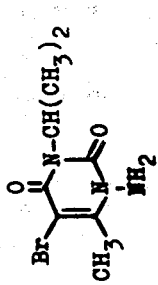 | 2 | 5 | 5 | 5 | 5 | 5 | 5 | 5 | 5 |
|  | 1 | 5 | 5 | 5 | 5 | 5 | 5 | 5 | 5 |

EXAMPLE B

Pre-emergence test
Solvent: 5 parts by weight of acetone
Emulsifier: 1 part by weight of alkylaryl-polyglycol-ether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After 3 weeks, the degree of damage to the test plants was determined and characterized by the values 0 – 5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The active compounds, the amounts applied and the results obtained can be seen from the following Table B and C.

Table B
Pre-emergence test

| Active compound | Amount of active compound used, kg/ha | Echino-chloa | Cheno-podium | Sina-pis | Stella-ria | Lolium | Galin-soga | Matri-caria | Cotton | Wheat | Maize |
|---|---|---|---|---|---|---|---|---|---|---|---|
| Br—, CH$_3$, N-CH-C$_2$H$_5$, CH$_3$ (known) | 5 | 5 | 5 | 5 | 5 | 5 | 5 | 5 | 5 | 5 | 5 |
| | 2.5 | 5 | 5 | 5 | 5 | 5 | 5 | 5 | 4-5 | 5 | 4 |
| | 1.25 | 5 | 5 | 5 | 4-5 | 5 | 5 | 5 | 4 | 5 | 4 |
| Br—, phenyl, NH$_2$, CH$_3$ | 5 | 5 | 5 | 5 | 5 | 4 | 5 | 5 | 2 | 1 | 0 |
| | 2.5 | 4 | 5 | 5 | 5 | 4 | 5 | 5 | 1 | 0 | 0 |
| | 1.25 | 3 | 4 | 5 | 5 | 3 | 5 | 5 | 0 | 0 | 0 |
| Br—, CH$_3$, N-CH-C$_2$H$_5$, NH$_2$, CH$_3$ | 5 | 5 | 5 | 5 | 5 | 5 | 5 | 5 | 2 | 0 | 2 |
| | 2.5 | 5 | 5 | 5 | 4-5 | 4-5 | 5 | 5 | 1 | 0 | 0 |
| | 1.25 | 5 | 5 | 5 | 4 | 4 | 5 | 5 | 0 | 0 | 0 |

Table B (continued)
Pre-emergence test
| Active compound | Amount of active compound used, kg/ha | Echino-chloa | Cheno-podium | Sina-pis | Stella-ria | Lolium | Galin-soga | Matri-caria | Cotton | Wheat | Maize |
|---|---|---|---|---|---|---|---|---|---|---|---|
| 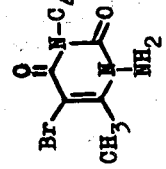 | 5 | 5 | 5 | 5 | 5 | 5 | 5 | 5 | 1 | 1 | 0 |
|  | 2.5 | 4 | 5 | 4 | 4 | 4 | 5 | 5 | 0 | 0 | 0 |
|  | 1.25 | 4 | 4 | 4 | 4 | 4 | 5 | 5 | 0 | 0 | 0 |
| 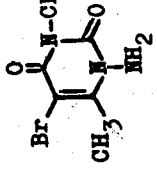 | 5 | 5 | 5 | 4 | 5 | 5 | 5 | 5 | 2 | 2 | 1 |
|  | 2.5 | 5 | 5 | 4 | 5 | 4 | 5 | 5 | 1 | 1 | 0 |
|  | 1.25 | 5 | 5 | 3 | 4 | 4 | 5 | 5 | 0 | 0 | 0 |

Table C
Pre-emergence test
| Active compound | Amount of active compound used, kg/ha | Echino-chloa | Alo-pecurus | Poa | Galin-soga | Poly-gonum | Amaran-thus | Urtica | Soya beans |
|---|---|---|---|---|---|---|---|---|---|
| 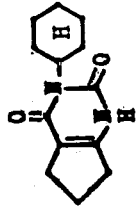 (known) | 5 | 3 | 3 | 4 | 4-5 | 5 | 3 | 5 | 1 |
| | 2.5 | 3 | 2 | 3 | 4 | 4 | 3 | 3 | 0 |
| | 1.25 | 3 | 1 | 2 | 3 | 4 | 2 | 1 | 0 |
| 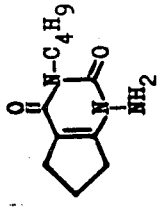 | 5 | 5 | 5 | 5 | 5 | 5 | 4 | 5 | 0 |
| | 2.5 | 4 | 4 | 5 | 5 | 5 | 4 | 5 | 0 |
| | 1.25 | 2 | 2 | 3 | 5 | 5 | 4 | 5 | 0 |
| 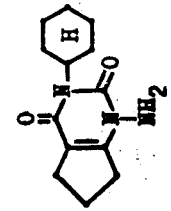 | 5 | 5 | 5 | 5 | 5 | 5 | 5 | 5 | 1 |
| | 2.5 | 5 | 5 | 5 | 5 | 5 | 4-5 | 5 | 0 |
| | 1.25 | 4 | 4-5 | 5 | 5 | 5 | 4 | 5 | 0 |

What is claimed is:

1. 1-Aminouracil compound of the formula

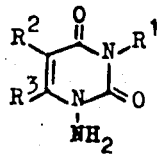

in which

R¹ is alkyl of one to 13 carbon atoms, alkenyl of three to six carbon atoms, alkynyl of three to six carbon atoms, cycloalkyl of five to eight carbon atoms, alkylcycloalkyl of five to eight carbon atoms and one to three alkyl side chain carbon atoms, monohalocycloalkyl of five to eight carbon atoms, norbornylmethyl, haloalkyl of two to six carbon atoms and one to three halogen atoms, monocyanoalkyl of two to six carbon atoms, alkoxyalkyl, alkoxycarbonylalkyl of one to four carbon atoms in the alkyl part and one to three carbon atoms in the alkoxy part, alkylcarbonyl of two to six carbon atoms in the alkyl part, alkoxyalkylcarbonyl of two to six carbon atoms in the alkyl part and one to four carbon atoms in the alkoxy part, aroxyalkylcarbonyl of from six or ten carbon atoms in the aryl part and one or two carbon atoms in the alkyl part, aralkyl of from six or 10 carbon atoms in the aryl part and one or two carbon atoms in the alkyl part, aralkyl of from six or 10 carbon atoms in the aryl part and one or two carbon atoms in the alkyl part and substituted in the aryl part, arylcarbonyl of from six or 10 carbon atoms in the aryl part, phenoxycarbonyl, substituted phenoxycarbonyl, aryl of from six or 10 carbon atoms, or substituted aryl of from six or 10 carbon atoms, wherein the substituents on said substituted moieties are selected from the group consisting of straight-chained or branched alkyl of from one to six carbon atoms, haloalkyl of from one to four carbon atoms and one to three halogen atoms, alkoxy of from one to four carbon atoms, dialkylamino of from one to four carbon atoms in the straight chain or branched alkyl part, nitro, nitrile, halogen, haloalkoxy of from one to two carbon atoms and three to five halogen atoms and alkoxycarbonylalkenyl of from two or three carbon atoms in the alkenyl part and one to three carbon atoms in the alkyl part; and wherein R₁ has not more than 16 carbon atoms;

R² is hydrogen, halogen, alkyl having not more than 16 carbon atoms, or aryl of from six or 10 carbon atoms optionally substituted by a substituent as recited above; and R³ is alkyl of one to six carbon atoms, or phenylalkyl with one to three carbon atoms in the alkyl part, and herbicidally acceptable salts of such compound.

2. Compound as claimed in claim 1 designated 1-amino-3-(1-methyl-n-propyl)-5-bromo-6-methyl uracil.

3. Compound as claimed in claim 1 designated 1-amino-5-bromo-3-cyclohexyl-6-methyl-uracil.

4. Compound as claimed in claim 1 designated 1-amino-3-isopropyl-5-bromo-6-methyl-uracil.

5. Compound as claimed in claim 1 designated 1-amino-3-n-butyl-5-bromo-6-methyl uracil

* * * * *